United States Patent [19]

Hager

[11] Patent Number: 4,643,861
[45] Date of Patent: Feb. 17, 1987

[54] RECLAMATION OF SCRAP VINYLIDENE CHLORIDE POLYMER COATED FILM

[76] Inventor: Joseph F. Hager, 8809 Nottingham Pkwy., Louisville, Ky. 40222

[21] Appl. No.: 751,201

[22] Filed: Jul. 2, 1985

[51] Int. Cl.⁴ .................. B29B 17/00; B29C 47/00; C08J 11/04
[52] U.S. Cl. .................. 264/118; 264/37; 264/143; 264/DIG. 69; 521/46; 521/46.5
[58] Field of Search .............. 264/37, 68, DIG. 69, 264/117, 118, 140, 141, 349, 211, 143; 521/46, 46.5, 44.5; 526/213, 237; 428/518

[56] References Cited

U.S. PATENT DOCUMENTS 3,562,373  2/1971  Logrippo ........................ 264/118
4,379,116  4/1983  Moynihan ...................... 264/211 X

OTHER PUBLICATIONS

The Condensed Chemical Dictionary, 10th Edition, New York, Van Nostrand Reinhold Co., pp. 841 and 909.

Primary Examiner—Donald Czaja
Assistant Examiner—Leo B. Tentoni
Attorney, Agent, or Firm—Donald L. Cox

[57] ABSTRACT

Disclosed herein is a process for treating scrap thermoplastic film which has been treated with a saran coating. When the scrap film is cut into a convenient size, it is densified in the presence of a treatment medium which comprises a mixture of lime and an alkyl carboxylate and molded into pellet form. These pellets may then be employed in conventional extrusion and molding equipment without any degradation of the equipment which was normally seen when untreated saran-coated, scrap films were attempted to be molded or extruded.

11 Claims, No Drawings

RECLAMATION OF SCRAP VINYLIDENE CHLORIDE POLYMER COATED FILM

BACKGROUND OF INVENTION

1. Field of Invention

This invention relates to reclamation processes. More particularly, this invention relates to processes for treating scrap film so that the film can be reused in plastic molding and extrusion applications.

2. Prior Art

For many years SARAN- or vinylidene chloride polymer-coated materials have been known to be useful in the food packaging industry. Because of the extremely large volume of film produced for these packaging applications, of necessity a large volume of scrap film results. Scrap film is produced, for example, as a result of wastage or trimming which occurs during film processing.

While SARAN-coated films have excellent properties for use in food packaging, the post-treatment or reclamation of these films has to date not allowed the use of the reclaimed materials in conventional plastic extrusion and molding equipment. This is due in large part to the fact that the presence of chlorine in the SARAN coating on the laminated film causes pitting, or other degradation of the molds or extruder surfaces which come into contact with the reclaimed polymer. Thus, while the remolding and reuse of conventional scrap film is well known, no commercially viable process has been available for the molding of scrap, SARAN-coated, polyolefinic films.

It is known that scrap polyolefinic film treated with a polychlorinated overcoating may subsequently be treated with lime to improve its usefulness in remolding applications. However, the lime treatment process is deficient in that it does not completely neutralize the chlorine present in the scrap film. As a result, when attempts are made to mold or extrude this scrap film, the processing equipment continues to be subject to pitting and other degradation on the equipment surfaces which are exposed to the SARAN-coated, scrap film.

Accordingly, it is an object of this invention to provide a process which will allow the remolding of SARAN-coated, scrap, thermoplastic films.

It is another object of this invention to develop a process to allow the use of otherwise discarded scrap polymeric film.

It is yet another object of this invention to prepare molded plastic products in conventional molding equipment employing scrap, processed film, which scrap film will not degrade molding equipment.

These and other objectives are obtained by employing the process of the instant invention.

SUMMARY OF INVENTION

This invention involves a method for reprocessing scrap polymeric film of the type which is comprised of a laminate of two films. The first film is a thermoplastic film such as polyethylene or polypropylene. Laminated to this base film is a polychlorinated topcoat of the SARAN type. Scrap film of this type is reprocessed according to the instant invention first by cutting the film into rectangular shapes of convenient size—less than about a foot square. These shapes are then densified to form film balls of less than about the one inch in diameter in the presence of water and about 5-25 percent by weight of a treatment medium comprising a mixture of about 5 to about 40 percent by weight of a metal carboxylate and about 95 to about 60 percent by weight of hydrated lime.

After the film is densified, it is introduced into a vented extruder equipped with a vacuum pump and formed into small, cylindrical pellets about ⅛ in. in diameter and about ⅛ in. long. These pellets can then be used in any type of conventional plastic molding or extrusion application such as to form flower pots. The products of the instant invention, contrary to prior art, scrap film products, will not pit or otherwise cause degradation of molds or extruders in which they are employed.

DETAILED DESCRIPTION OF INVENTION

As pointed out above, this invention involves a method for treating scrap, laminated film which is comprised of one or more than one layer of a SARAN or vinylidene chloride type film laminated to one or more than one layer of another thermoplastic film. The scrap film is produced as a result of wastage during processing, from trimming of the processed film, or at any time during the manufacturing process when useful film has not been produced. The most common embodiment of the films which are treated according to the process of the instant invention comprises a layer of SARAN or polyvinylidene chloride type polymers laminated to a layer of polyethylene or polypropylene film.

The copolymers of vinylidene chloride and at least one other ethylenically unsaturated monomer are well known in the art for use in saran coating compositions. Representative monomers useful in preparing these vinylidene chloride copolymers included: acrylic acid; acrylates such as methyl, ethyl, isobutyl, butyl and 2-ethyl hexyl acrylates; methacrylates such as methyl, phenyl, cyclohexyl, methoxyethyl and chloroethyl methacrylate; methyl alpha-chloroacrylate; methyl isopropenyl ketone; acrylonitrile; methacrylonitrile; methyl vinyl ketone; vinyl chloroacetate; vinyl bromide; styrene; vinyl naphthalene; ethyl vinyl ether; N-vinyl phthalimide; N-vinyl succinimide; N-vinyl carbazole; acrylamide; methacrylamide; phenyl vinyl ketone; diethyl fumarate; methacrylic acid; itaconic acid; dimethyl itaconate; and the like. The most useful monomers fall within the general formula:

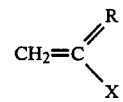

where R is hydrogen, halogen, or a saturated aliphatic radical, and X is one of —Cl, —Br, —F, —CN, —C$_6$H$_5$, —COOH,

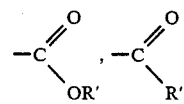

—CH=O, —OC$_6$H$_5$, —CONH$_2$, —CONH—R'; and —CONR'$_2$ where R' is alkyl.

The coatings made from these SARAN type polymers may be applied by a wide variety of methods. However, the coating bath is the most commonly used method. These baths may be modified by use of a variety of materials including mono- and diglycerides, poly basic acids of phosphoric or sulfuric acid, anti-sticking agents, linear polyester resins to enhance the bonding between the base film and the SARAN overcoating, crosslinking agents and the like.

Coating baths of the above described coating compositions are prepared by dissolving the vinylidene chloride copolymer in a volatile organic solvent such as tetrahydrofuran, toluene, methyl ethyl ketone, or mixtures thereof. Conveniently the glyceride, linear polyester, waxes, partial ester or phosphoric acid, crosslinking resin, etc., are added to the vinylidene chloride bath, preferably after having been dissolved in the same solvent as is present in the coating bath. The coating composition is applied to one or more surface of the selected substrate using a conventional apparatus such as a gravure roll or doctor roll, followed by drying to remove the solvent.

The above described coating compositions can be coated onto a variety of base films and surfaces, in particular films of organic polymers. Especially useful are those where the base film surface is regenerated cellulose, polyester, polyamide, polyacrylates and methacrylates, polyepoxides, polyvinyl chloride, polyvinylidene chloride, polyacrylonitrile, and polyolefins such as polyethylene and polypropylene.

The base film may range in thickness from several mils to a small fraction of a mil. Most often the thickness will range from about one mil to about half a mil.

The amount of coating applied will ordinarily be up to about 5 g./m.$^2$, and most often be in the range of about 2.5 to 3.5 g./m.$^2$.

The films which are useful in carrying out the process of the instant invention are employed predominately as packaging materials for foods and household products. Patents describing these materials include U.S. Pat. Nos. 4,115,334, 4,379,117 and 3,821,182 all of which are incorporated herein by reference.

The process of the instant invention involves cutting the SARAN laminated, scrap film into a useable shape of about less than approximately one foot square. Scrap film of this size is more readily handled and more easily fits into the densifier described hereafter. Preferably the film is cut to about 6 in. by 10 in. rectangles using a plastic, knife-type cutter of conventional design.

Following cutting, the plastic film is introduced into a densifier wherein it is processed into ⅛ in. to ¾ in. in diameter balls preferably ¼ in. to ½ in. in diameter. These balls are formed as a result of the slight melting of the scrap film which occurs during the densification process.

The densification process begins by adding the cut film to the densifier and activating the machine's chopping blades. As the chopping occurs, the temperature of the film mixture rises but it should not be allowed to increase above about 20° F. to 100° F. below the melting point of the polymeric film. In some cases, of course, spot heating above this level allows some melting of the scrap film and causes the formations of the balls referred to above. In order to control the temperature of the film in the densifier, water is periodically added. Usually from about 5 to 25 percent by weight of water, preferably about 5 to about 15 percent by weight, based on the total weight of the film in the densifier will be added during the densification process.

Simultaneously with the addition of water, the treatment medium is added to the mixture. The treatment medium serves to deactivate any harmful chlorine which is present in the film and thereby to allow the use of the processed film in subsequent molding and/or extrusion applications. The treatment medium comprises a mixture of generally about 5 to about 40 percent by weight of a metal carboxylate, preferably a Group 2 metal, $C_2$-$C_{18}$ alkyl carboxylate and most preferably, calcium stearate and about 95 to about 60 percent by weight of hydrated lime which will pass through at least 100 mesh standard screens preferably 200 mesh standard screens. Preferably about 5 to about 15 percent of the treatment medium is the metal carboxylate with the remainder being hydrated lime.

Examples of the Group 2 metals include magnesium, calcium, zinc, strontium, cadmium, barium and mercury. Other metals may also be employed such as boron, aluminum, tin, lead, bismuth, antimony and the like. However, the Group 2 metals are preferred. Among the carboxylates, either the aliphatic or aromatic carboxylates may be employed although aliphatic carboxylates are preferred. The aromatic carboxylates include benzoic acid. The aliphatic carboxylates include the acetates propionates, butyrates as well as the longer chained saturated acids such as stearic acid. Unsaturated acids ranging up to $C_{18}$ may also be employed, however, the straight chained, saturated acid such as stearic acid in particular are the most preferred.

The amount of the treatment medium which is added depends upon the weight of SARAN which has been laminated to or coated on the base thermoplastic film. For a 90/10 percent by weight mixture of lime and calcium stearate the amount of the treatment medium which is added equals at least about 70 percent preferably 75 percent by weight of the total weight of SARAN coating on the scrap film. The maximum amount of treatment medium should not exceed 150 percent of the SARAN coating weight.

Reaction and densification of the material is continued for approximately 5 to 15 minutes following addition of the treatment medium while maintaining the reaction temperature at the level indicated above by the periodic addition of water. In general, the reaction is determined to be complete when the mixture in the reactor has inverted in the reactor on three separate occasions. Inversion is determined by observing the densified film mass as it climbs up the side of the reactor and falls back toward the center. After each occurence of such an inversion, the temperature in the reactor will be somewhat reduced and the densified film will once again slowly begin climbing up the sides of the reactor. When this process has gone through three cycles it is determined that densification is completed.

At this point, the rough balls, ⅛ in. to ½ in. in diameter, which result are removed from the densifier. Because of the high temperature at which the densification process occurs, normally no water will be present. Most of the added water will have simply evaporated as steam.

The balls produced by this process are then transferred to a vented extruder equipped with a vacuum pump which is heated to slightly above the melting point of the film. For example, for polypropylene film the extruder will be heated to approximately 380° F. The vacuum which is applied to the extruder is employed to remove any residual water which is present after the densification process. In usual operation, a vacuum in excess of about 15 in. of mercury preferably in excess of about 25 in. of mercury is employed.

The densified balls are added to the hopper of the extruder and the extruder melts the balls and forces the extruded polymer out preferably through a spaghetti dye head which forms multiple stands of spaghetti-like fibers. (The reprocessed film may, of course, take any form such as strands, pellets or chips.) Preferably the fibers have a diameter of about an ⅛ in., although fiber diameter is not crucial and much thinner or thicker fibers may be prepared. Following extrusion, the spaghetti-like fibers are allowed to pass through a water cooling bath to reduce the temperature of the fibers. After extrusion into the water bath, the spaghetti-like strands are removed from the bath and treated with an air knife to evaporate any residual water present on the surface of the fiber. The fibers are then chopped to form small cylinders having a diameter equal to the diameter of the fiber and a length preferably of about ⅛ in. These, so-called, pellets are then bagged and shipped for further use in extrusion or molding processes.

The pellets may be used in any conventional molding apparatus to form a wide variety of products. For example, they may be blended with asphalt or other materials to form roofing sheeting or they may be blended with conventional fillers and reinforcing agents to form horticultural products such as flower pots or other common molded products.

As pointed out above, in the prior art when attempts were made to reuse SARAN-coated scrap film, degradation of mold or extruder surfaces which came in contact with these films was a significant problem. However, by using the process of the instant invention, full utilization of scrap, SARAN-coated thermoplastic films may be obtained without any significant harm to mold or extrusion equipment.

EXAMPLE

Scrap SARAN-coated polypropylene having a film thickness of about 2.5 mil and a percent saran coating of about 12 percent was cut into 6 in. by 10 in. rectangles using a Guillotine cutter. 200 pounds of these film rectangles were added to an MGB, Inc. densifier and the densification process was begun. After about 5 minutes the temperature in the densifier had reached approximately 300° F. at which point about a gallon of water was added to the mixture along with 24 pounds of a treatment medium containing 83.4 percent chemically hydrated lime and 16.6 percent calcium stearate. The chemically hydrated lime exhibited a particle size which allowed 100 percent of the particles to pass through a 100 mesh standard screens, 99.5 percent through a 200 mesh screens, and 99.0 percent through a 325 mesh screens.

The material in the densifier was processed and chopped for approximately 12 minutes. Over that period of time an additional 22 pounds of water were added in two equal aliquots. During the 12 minute period the film in the densifier was seen to invert after moving up the sides of the reactor on three separate occasions. After 12 minutes of densification all of the visible water which had been added had been driven off as steam and the film had been converted into rough balls having a diameter of between ½ in. and ¼ in.

The densified balls were removed from the densifier and added to a 4½ in. vented extruder operating at a temperature of about 380° F. The extruder was provided with a vacuum to remove excess water. The vacuum operated at 25 in. of mercury. The extruder was equipped with a spaghetti dye containing 25 extrusion orifices each having an orifice diameter of about ⅛ in. As the extruder was operated spaghetti-like fibers of densified polypropylene film were extruded into a water bath maintained at or near room temperature. After passing through the water bath the strands were treated with an air knife to remove residual water, were chopped into approximately ⅛ in. length and bagged.

The resulting recovered, scrap, polypropylene film had a moisture content of 0.19 percent, a density of 0.910 g/cm$^3$, a melting point of 332° F. to 334° F. and contained less than 1.0 ppm. hydrochloric acid. The chopped fibers were subsequently used in molding various products including asphalt containing roofing compositions and flower pots. In each instance stainless steel or nickel coated molds or extruders were employed. Unlike prior art, SARAN-coated film, the products prepared according to the process set out above did not score, scratch, degrade, or pit the extrusion devices in which they were employed.

I claim:

1. A process for treating scrap, vinylidene chloride polymer-coated, thermoplastic film so as to render the film useful for conventional molding and extrusion applications without damage to the surfaces of molding and extrusion equipment to which the film is exposed, which comprises densifying the film, with chopping, in the presence of a treatment medium which comprises about 95 to about 60 percent by weight of lime and about 5 to about 40 percent by weight of a metal carboxylate.

2. The process of claim 1 wherein the scrap film is cut into a convenient size prior to densification.

3. The process of claim 1 wherein the densified film is extruded into moldable or extrudable pellets.

4. The process of claim 1 wherein the thermoplastic film is a polyolefinic film and the vinylidene chloride polymer-coating is a polyvinylidine chloride coating.

5. The process of claim 1 wherein the treatment medium comprises a $C_2$–$C_{18}$ Group 2 metal carboxylate.

6. The process of claim 1 wherein the carboxylate is calcium stearate.

7. The process of claim 1 wherein about 5 to about 25 percent by weight of water based upon the amount of film in the densifier is added to the densifier during the densification process.

8. The process of claim 3 wherein the pellets are further molded to form an article.

9. The process of claim 8 wherein the article is a flower pot.

10. The process of claim 8 wherein the article is a roofing material.

11. A process for treating scrap, vinylidene chloride polymer-coated thermoplastic film so as to render the film useful for conventional molding and extrusion applications without damage to the surface of mold and extrusion equipment to which the film is exposed which comprises (a) cutting the scrap film into a convenient size, (b) densifying the film with chopping in the presence of a treatment medium which comprises about 95 to about 60 percent by weight of lime and about 5 to about 40 percent by weight of a metal carboxylate and (c) extruding the densified film to form moldable or extrudable pellets.

* * * * *